UNITED STATES PATENT OFFICE.

JAMES M. POLLARD, OF WASHINGTON, DISTRICT OF COLUMBIA, ASSIGNOR TO HIMSELF AND BEVERLY R. CODWISE, OF SAME PLACE, AND FORDYCE L. KELLOGG, OF NEW YORK, N. Y.

EXPLOSIVE AND PROCESS OF MAKING THE SAME.

SPECIFICATION forming part of Letters Patent No. 463,769, dated November 24, 1891.

Application filed November 6, 1890. Serial No. 370,522. (No specimens.)

*To all whom it may concern:*

Be it known that I, JAMES M. POLLARD, a citizen of the United States, residing at Washington, in the District of Columbia, have invented certain new and useful Improvements in Explosives and in Processes of Manufacturing the Same; and I do hereby declare the following to be a full, clear, and exact description of the invention, such as will enable others skilled in the art to which it appertains to make and use the same.

My invention relates to improvements in gun and mining powders and in compounds therefor, as well as in novel processes of incorporating, granulating, and waterproofing the same, all as will be fully described hereinafter, and it is especially applicable to classes of explosives hitherto considered dangerous of fabrication and incorporation and unstable after manufacture.

The objects of my invention are to obtain perfect incorporation of the ingredients of compounds that cannot safely be incorporated by milling or by the ordinary mixing-machines; to secure thorough waterproofing of the particles composing such compounds to render the manufacture safe and economical, and stable, safe, and reliable as to all matters of storage, transportation, and use.

My invention consists in the process of first minutely subdividing, as by grinding, to an impalpable powder the chlorates, nitrates, &c., which contain the oxygen, and also grinding separately the charcoal, carbonates, sulphates, or sulphur, where these are employed; in melting one or more of the ingredients of the compound to be formed at a temperature below the melting or decomposing, or volatilizing or oxidizing temperatures of any of the other ingredients, and in then adding such other ingredients to the melted substance and raising the temperature thereto, whereby the finely-divided solids act by capillary attraction to absorb and distribute the melted substance uniformly throughout the mass, and are then intimately mingled with each other, all as will be more specifically described hereinafter.

My invention further consists in incorporating the melted substance as one of the ingredients of a compound and as a lubricant to prevent actual contact of particles of other substances too sensitive to mix by dry frictional contact with each other.

I will illustrate the operation of my process by reference to an explosive composed of chlorate of potassium, sulphur, and a hydrocarbon, such as paraffine, though any hydrocarbon free from easily-oxidizable matter and solid at normal temperatures would be available. I grind the chlorate and the sulphur separately to an impalpable powder and melt the paraffine in a water bath at or below the boiling-point. The paraffine of commerce melts at about 180° Fahrenheit, water boils at 212° Fahrenheit, and sulphur melts at 218° Fahrenheit, so that I am enabled to add the sulphur in its powdered form to the paraffine, which it absorbs, and to thoroughly coat each infinitesimal particle of the sulphur with the melted hydrocarbon without danger of melting the sulphur, which in this instance is to be avoided. I next add the chlorate, either previously raising the temperature to or near 212° Fahrenheit or permitting it to gradually acquire that temperature after addition, and let it remain until it has absorbed or has become permeated by the fluid hydrocarbon. I then thoroughly incorporate the mass for the double purpose of mixing the sulphur and the chlorate with each other and of insuring each particle of the sulphur and chlorate a covering of the melted paraffine. I then press the compound into cartridges or grains of the form desired or permit it to gradually cool, meantime subjecting it to continuous and vigorous stirring or incorporation. Detonating compounds act to best advantage if in fine powder, and if cooled in the manner described each particle retains its coating of paraffine and does not adhere to the others, while if it is allowed to cool in a mass and the mass is subsequently broken up the hydrocarbon separates by fracture cleanly from the sulphur or the chlorate and permits actual contact between them, thus forming a most dangerously-sensitive compound. When cooled in a mass, this powder becomes very firm and solid, and if then crushed to powder the powder consists mostly of separate particles of chlorate of sulphur and of detached films of crystalline paraffine, intimately mingled, but in no sense waterproofed, or with the chlorate and sulphur separate from each other, as by my process. The incorporation is, moreover, not as perfect as by my process and the detonation much less energetic. I contemplate passing the hot product through fine sieves and letting the particles fall some distance, if necessary retarding them by a current of cold air, if I should find it necessary to economize time in this manner.

Combined by the foregoing process I have made a series of grades of explosive composed of the following proportions:

|  | No. 1. | No. 2. | No. 3. | No. 4. | No. 5. | No. 6. | No. 7. |
|---|---|---|---|---|---|---|---|
| Chlorate of potassium...... | 825 | 725 | 600 | 500 | 400 | 300 | 200 |
| Nitrate of potassium...... | 000 | 100 | 200 | 300 | 400 | 500 | 600 |
| Sulphur......... | 075 | 075 | 100 | 100 | 100 | 100 | 100 |
| Paraffine...... | 100 | 100 | 100 | 100 | 100 | 100 | 100 |

These are all detonating compounds, the violence of detonation perceptibly diminishing with each grade from No. 1 to No. 7. No. 1 is more powerful than No. 1 dynamite and is far less sensitive and dangerous to manufacture or use. No. 7 is about equal to twenty per cent. of nitro-glycerine with an active or explosive base.

I propose to employ for the most sensitive and dangerous compounds hydrocarbons having as high melting and igniting points as my process will admit of incorporating in order to reduce the liability to accident, while for difficultly-ignited compounds I may employ nitro-hydrocarbons, it being understood that in describing my process and claiming the same I mean to include all substances adapted to said process.

I am aware that explosive matters have been treated with hydrocarbons in solution or of a fluid or viscous nature. These I do not claim.

I am aware that sulphur and the other ingredients of gunpowder have been incorporated in the ordinary manner and the product thus formed submitted to a temperature exceeding the melting-point of sulphur, whereby the sulphur was fused; but this is obviously not at all the equivalent of my process.

I am also aware that paraffine has been incorporated with a variety of other substances to form explosive compounds; but this has usually been accomplished by solution or by melting two or more of the ingredients together and then breaking up and incorporating the mass, and has never, so far as I know or believe, been used in the manner described herein.

I am also aware that chlorates—as of potassium—and nitrates—as of potassium—have been combined in a compound with oxidizable matters to form an explosive.

I therefore claim as new and desire to protect by Letters Patent—

1. The process of incorporating together chlorates and sulphur, which consists in coating the finely-divided particles of the same with a hydrocarbon maintained in a melted condition at a temperature below the melting-temperature of the sulphur, and in then agitating said substances, whereby they are coated and lubricated with the inert hydrocarbon during the incorporation, as described and set forth.

2. The mode or process of incorporating oxygen-bearing salts and sulphur, which consists in first melting a hydrocarbon solid at normal temperature and having a melting-point below that of sulphur, introducing thereinto finely-divided sulphur, preferably in the form of flour, agitating the compound so as to provide for each particle of sulphur a coating of the hydrocarbon, then introducing into the compound a finely-divided oxygen-bearing salt or salts, such as described, and again agitating the mass to likewise form a coating for each particle of the oxygen-bearing salt or salts and for intermingling the same with the sulphur, for the purpose set forth.

3. The herein-described explosive powder, composed of chlorate and sulphur, the particles of each constituent being coated with paraffine, as set forth.

4. The herein-described explosive compound, composed of finely-divided sulphur, chlorate, and nitrate, the particles of each constituent having a coating of paraffine, as set forth.

In testimony whereof I affix my signature in presence of two witnesses.

JAMES M. POLLARD.

Witnesses:
S. WOLF,
SAML. H. JACOBSON.